(12) United States Patent
Lee et al.

(10) Patent No.: US 10,496,217 B2
(45) Date of Patent: Dec. 3, 2019

(54) MUTUAL CAPACITANCE INTEGRAL SENSING APPARATUS FOR TOUCH AND FORCE SENSING AND METHOD FOR THE SAME

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 61 days.

(21) Appl. No.: 15/484,088

(22) Filed: Apr. 10, 2017

(65) Prior Publication Data

US 2017/0300167 A1    Oct. 19, 2017

(30) Foreign Application Priority Data

Apr. 18, 2016  (TW) .............................. 105111972 A (51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 2203/04105* (2013.01)

(58) Field of Classification Search
CPC .......... G06F 3/045; G06F 3/041; G06F 3/044; G06F 3/0414; G06F 3/0416;
(Continued)

(56) References Cited

U.S. PATENT DOCUMENTS

2011/0080373 A1\* 4/2011 Wang ...................... G06F 3/044
345/174
2014/0062934 A1   3/2014 Coulson et al.
(Continued)

FOREIGN PATENT DOCUMENTS

CN    102609159 A    7/2012
CN    105302398 A    2/2016
(Continued)

OTHER PUBLICATIONS

Office Action dated Nov. 15, 2016 of the corresponding Taiwan patent application.
(Continued)

*Primary Examiner* — Lunyi Lao
*Assistant Examiner* — Jarurat Suteerawongsa
(74) *Attorney, Agent, or Firm* — Chun-Ming Shih; HDLS IPR Services (57) ABSTRACT

A mutual capacitance integral sensing apparatus for touch and force sensing includes a first electrode layer, a second electrode layer, a protection layer, a resilient dielectric layer and a capacitance sensing module. The first electrode layer includes a plurality of first electrodes extended along a first direction; the second electrode layer includes a plurality of second electrodes extended along a second direction; and the third electrode layer includes at least one third electrode extended along the first direction; where the first direction is substantially vertical to the second direction. In touch sensing operation, the capacitance sensing module sequentially or randomly applies a touch driving signal to selected ones of the second electrodes, and sequentially or randomly receives a touch sensing signal from selected ones of the first electrodes. In force sensing operation, the capacitance sensing module senses applied force through the second electrodes and the third electrode.

14 Claims, 8 Drawing Sheets

(58) Field of Classification Search
CPC . G06F 2203/04105; G06F 2203/04102; G06F 2203/04106; G06F 2203/04112; G06F 2203/04111; G06F 2203/04103; G06F 3/04; G01R 27/2605; G01L 1/146
See application file for complete search history.

(56) References Cited

U.S. PATENT DOCUMENTS

| | | | |
|---|---|---|---|
| 2014/0238152 A1* | 8/2014 | Kallassi | G01R 27/2605 73/862.626 |
| 2014/0354585 A1* | 12/2014 | Cok | G06F 3/0414 345/174 |
| 2016/0231849 A1 | 8/2016 | Watazu et al. | |
| 2017/0068368 A1* | 3/2017 | Hsiao | G06F 3/0416 |
| 2017/0220183 A1* | 8/2017 | Kim | G06F 3/0412 |
| 2017/0262112 A1* | 9/2017 | Noguchi | G06F 3/044 |

FOREIGN PATENT DOCUMENTS

| | | |
|---|---|---|
| TW | 201516813 A | 5/2015 |
| TW | M520681 U | 4/2016 |
| TW | M523910 U | 6/2016 |

OTHER PUBLICATIONS

Office Action dated Aug. 14, 2019 of the corresponding China patent application.

* cited by examiner

MUTUAL CAPACITANCE INTEGRAL SENSING APPARATUS FOR TOUCH AND FORCE SENSING AND METHOD FOR THE SAME

BACKGROUND OF THE INVENTION

Field of the Invention

The present invention relates to a sensing apparatus, especially to a mutual capacitance integral sensing apparatus for touch and force sensing.

Description of Prior Art

The touch display panels become popular as the market growing of the compact and lightweight mobile device. The force touch control technology has rapid development owing to the maturity of touch-control user interface and serious demand for 3D touch operation. The conventional force touch control panel generally integrates microelectromechanical sensor at edge or corner of the display panel to sense touch force on the display panel. The cost of the sensor is high and the assembling of the sensor is difficult. Besides, the conventional force touch control panel uses deformable resilient microstructure formed by complicated process to get better relevance between force and deformed degree. The force sensing can be improved by augmented physical variation. However, it still needs lots of effort to improve the force touch control panel.

SUMMARY OF THE INVENTION

It is an object of the present invention to provide a mutual capacitance integral sensing apparatus for touch and force sensing to overcome above-mentioned drawbacks.

Accordingly, the present invention provides a mutual capacitance integral sensing apparatus for touch and force sensing, the mutual capacitance integral sensing apparatus comprising: a first electrode layer comprising a plurality of first electrodes extended along a first direction; a second electrode layer comprising a plurality of second electrodes extended along a second direction substantially perpendicular to the first direction; a third electrode layer comprising at least one third electrode extended along the first direction; a protection layer arranged on a side of the first electrode layer; a resilient dielectric layer arranged between the second electrode layer and the third electrode layer; and a capacitance sensing module electrically connected to the first electrode layer, the second electrode layer and the third electrode layer; in touch sensing operation, the capacitance sensing module configured to select a plurality of second electrodes and a plurality of first electrodes, the capacitance sensing module configured to sequentially or randomly apply a touch driving signal to the selected second electrodes and sequentially or randomly receive a touch sensing signal from the selected first electrodes; in force sensing operation, the capacitance sensing module configured to perform force sensing by using the second electrodes and the at least one third electrode.

Accordingly, the present invention provides a method for mutual capacitance integral touch and force sensing, the method comprising: providing a mutual capacitance integral sensing apparatus, the mutual capacitance integral sensing apparatus comprising a first electrode layer comprising a plurality of first electrodes extended along a first direction, a second electrode layer comprising a plurality of second electrodes extended along a second direction substantially perpendicular to the first direction, a third electrode layer comprising at least one third electrode extended along the first direction, a protection layer arranged on a side of the first electrode layer, a resilient dielectric layer arranged between the second electrode layer and the third electrode layer; and a capacitance sensing module; in touch sensing operation, the capacitance sensing module selecting a plurality of second electrodes and a plurality of first electrodes, the capacitance sensing module sequentially or randomly applying a touch driving signal to the selected second electrodes and sequentially or randomly receiving a touch sensing signal from the selected first electrodes; and the capacitance sensing module performing a force sensing operation.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1A:
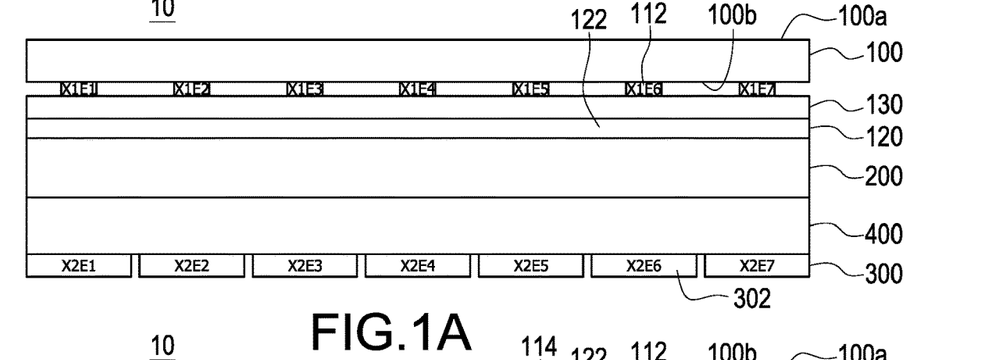
FIG. 1A shows a stack diagram of the mutual capacitance integral sensing apparatus for touch and force sensing of the present invention.

FIG. 1A shows a stack diagram of the mutual capacitance integral sensing apparatus for touch and force sensing (hereinafter integral sensing apparatus) 10 of the present invention. The integral sensing apparatus 10 comprises, from top to bottom, a protection layer 100, a first electrode layer 110, an insulation layer 130, a second electrode layer 120, a resilient dielectric layer 200, a substrate 400 and a third electrode layer 300. The protection layer 100 has a first face 100a and a second face 100b opposite to the first face 100a, where the first electrode layer 110 is arranged on the second face 100b. The first electrode layer 110 has a plurality of first electrodes 112 (such as the first electrodes X1E1~X1E7 in this figure) extended along a first direction. The second electrode layer 120 has a plurality of second electrodes 122 (such as the second electrodes YEn in FIG. 3) extended along a second direction. It should be noted that FIG. 1A only shows a schematic sectional view, the arrangement and distribution of the first electrodes 112 and the second electrodes 122 can be varied. The first electrode layer 110 and the second electrode layer 120 sandwich the insulation layer 130 therebetween, and the second electrode layer 120 (and correspondingly the second electrodes 122) is arranged on one side of the insulation layer 130 opposite to the protection layer 100. The third electrode layer 300 comprises at least one third electrode 302 (such as the third electrodes X2E1~X2E7 shown in FIG. 1A) extended along the first direction. The substrate 400 is arranged between the resilient dielectric layer 200 and the third electrode layer 300.

Figure 1B:
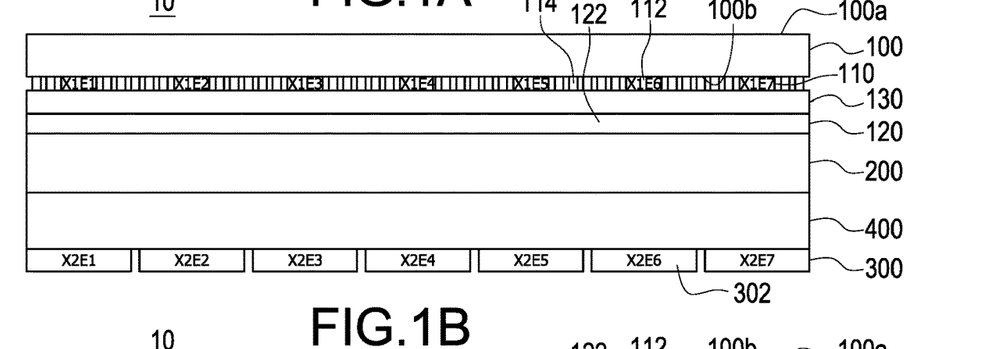
FIG. 1B shows a stack diagram of the mutual capacitance integral sensing apparatus for touch and force sensing according to another embodiment of the present invention.
Figure 1C:
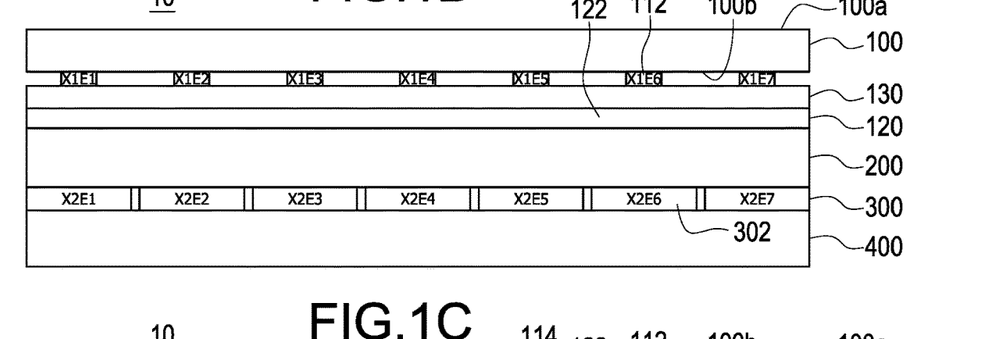
FIG. 1C shows a stack diagram of the mutual capacitance integral sensing apparatus for touch and force sensing according to still another embodiment of the present invention.

FIG. 1C shows a stack diagram of the integral sensing apparatus 10 according to another embodiment of the present invention. The embodiment shown in FIG. 1C is similar to that shown in FIG. 1A; however, the locations of the third electrode layer 300 and the substrate 400 exchange. Namely, in the embodiment shown in FIG. 1C, the third electrode layer 300 is placed between the resilient dielectric layer 200 and the substrate 400. In the embodiment shown in FIG. 1C, the substrate 400 may be a color filter substrate for a display panel and the third electrode layer 300 is the static shielding layer of the display panel.

Figure 3:
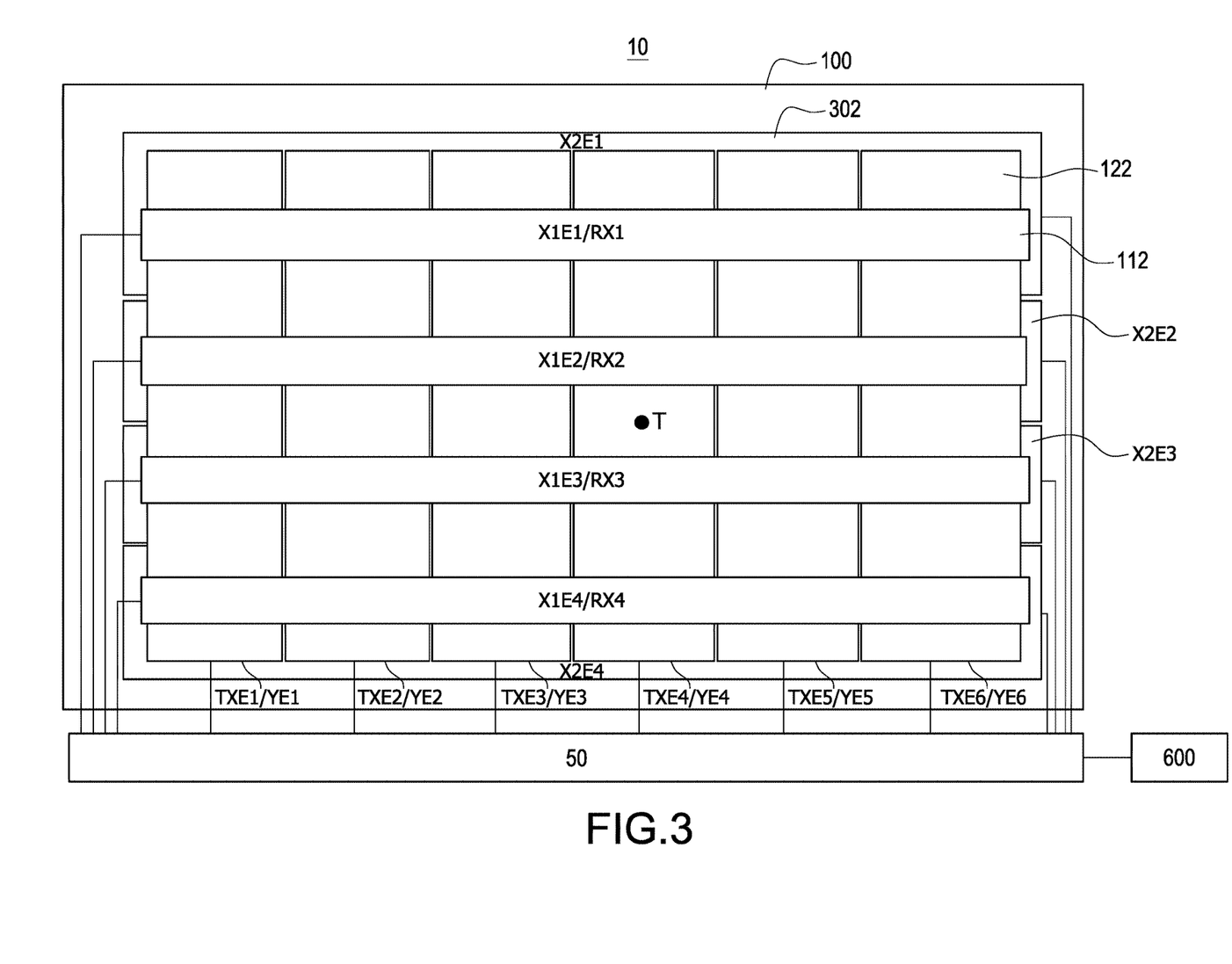
FIG. 3 shows a top view of the mutual capacitance integral sensing apparatus for touch and force sensing according to another embodiment of the present invention.

FIG. 3 shows a top view of the integral sensing apparatus 10 according to an embodiment of the present invention, which mainly depicts the distribution of the protection layer 100, the first electrodes 112, the second electrodes 122 and the third electrodes 302 from top view. It should be noted that part of the electrodes are purposely more separately with each other to clearly show individual feature/location. The scales of the first electrodes 112, the second electrodes 122 and the third electrodes 302 are not limited by this figure. The integral sensing apparatus 10 further comprises a capacitance sensing module 50. The first electrodes 112 (such as the first electrodes X1E1~X1E4 in this figure) extend along a first direction; however, the amount and distribution manner of the first electrodes 112 are not limited by the shown example. The second electrodes 122 (such as the second electrodes YE1~YE6 in this figure) extend along a second direction where the first direction is different with the second direction and may be substantially perpendicular to the second direction. Moreover, the amount and distribution manner of the second electrodes 122 are also not limited by the shown example. The third electrodes 302 (such as the third electrodes X2E1~X2E4 in this figure) extend along the first direction; however, the amount and distribution manner of the third electrodes 302 are not limited by the shown example.

Figure 4:
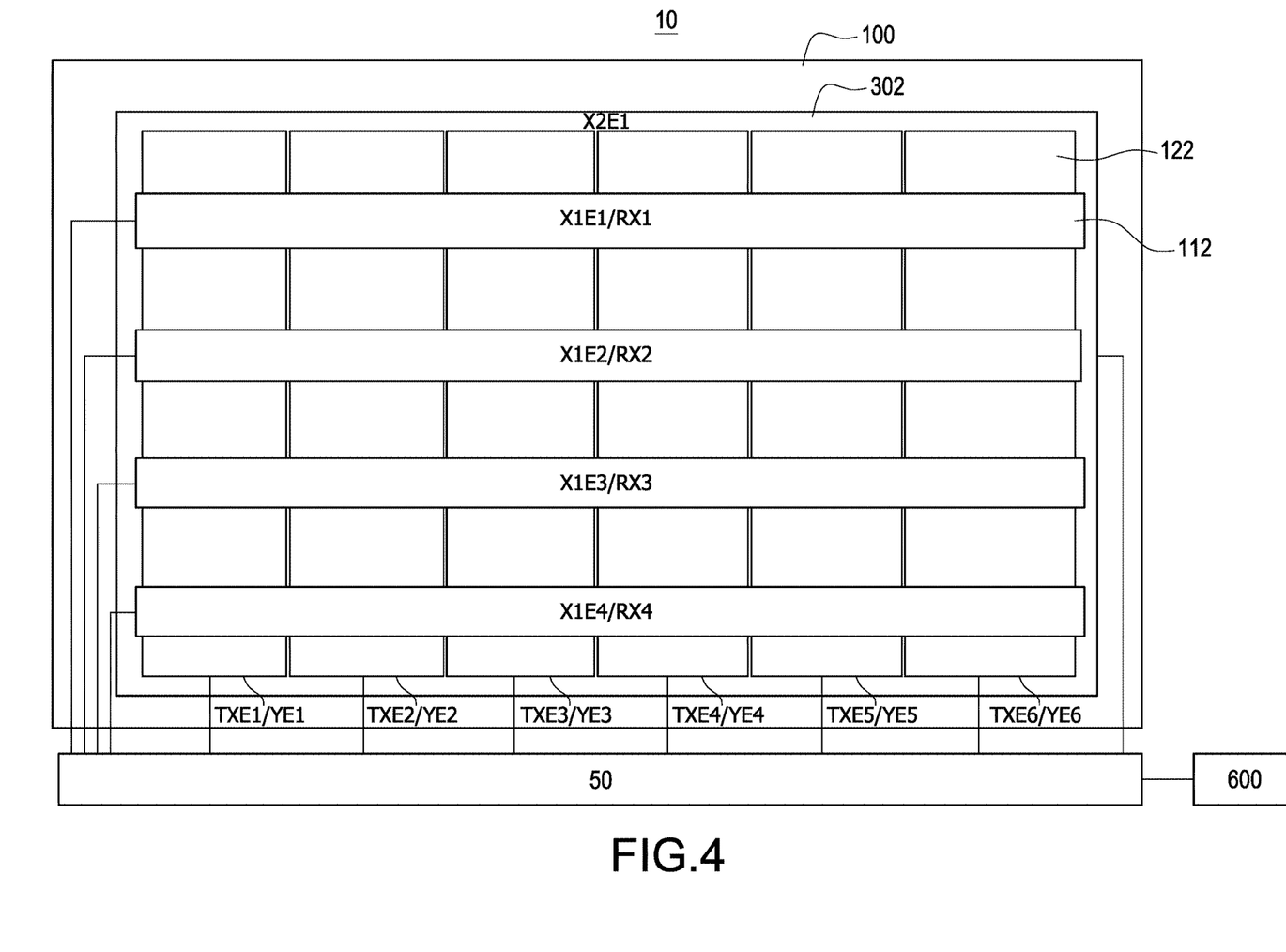
FIG. 4 shows a top view of the mutual capacitance integral sensing apparatus for touch and force sensing according to still another embodiment of the present invention.

FIG. 4 shows a top view of the integral sensing apparatus 10 according to another embodiment of the present invention, which mainly depicts the distribution of the protection layer 100, the first electrodes 112, the second electrodes 122 and the third electrodes 302 from top view. The embodiment shown in FIG. 4 is similar to that shown in FIG. 3. However, the third electrode layer 300 in FIG. 4 only has one third electrode (namely, the third electrode X2E1). Moreover, in the embodiments shown in FIGS. 3 and 4, the separation between two adjacent second electrodes 122 is preferably less than 50 um to have better shielding for the third electrode layer 300.

Figure 5A:
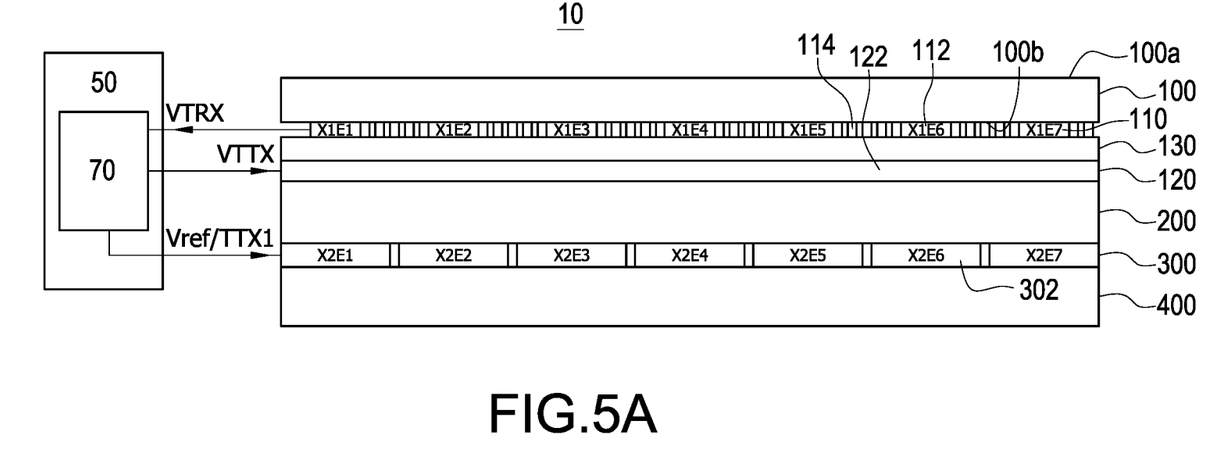
FIG. 5A shows a schematic diagram of the mutual capacitance integral sensing apparatus for touch and force sensing according to an embodiment of the present invention.

FIG. 5A shows a schematic diagram of the integral sensing apparatus 10 in touch sensing operation according to an embodiment of the present invention. The capacitance sensing module 50 further comprises a mutual-capacitance sensing circuit 70 electrically connected to the first electrodes 112, the second electrodes 122 and the third electrodes 302. With reference also to FIG. 3, the first electrodes 112 are used as sensing electrodes for the integral sensing apparatus 10 such that the integral sensing apparatus 10 can determine whether a finger is touching or close to it. The second electrodes 122 are used as driving electrodes for the integral sensing apparatus 10. The mutual-capacitance sensing circuit 70 first selects one or more first electrode(s) 112 and one or more second electrode(s) 122 for touch sensing. In below description, multiple selected first electrodes 112 and multiple selected second electrodes 122 are used for demonstration, it should be noted this application can also be applied to touch sensing with one selected first electrode 112 and one selected second electrode 122. The mutual-capacitance sensing circuit 70 sequentially or randomly applies a touch driving signal VTTX to the selected second electrodes 122 and sequentially or randomly receives a touch sensing signal VTRX from the selected first electrodes 112. By sensing the touch sensing signal VTRX, the integral sensing apparatus 10 can identify whether a touch event occurs at a location corresponding to an intersection of the selected first electrode 112 and the selected second electrode 122. With reference to FIG. 3, by applying the touch driving signal VTTX to the second electrode YE4 and sensing the touch sensing signal VTRX from the first electrode X1E2, the integral sensing apparatus 10 can identify whether a touch event occurs at a touch point T corresponding to an intersection of the second electrode YE4 and the first electrode X1E2. Moreover, in touch sensing operation, the mutual-capacitance sensing circuit 70 may apply a DC reference voltage Vref (such as a zero volt grounded voltage) to the at least one third electrode 302 to decrease or eliminate the measurement influence due to warp or deformation of the resilient dielectric layer 200. Moreover, the mutual-capacitance sensing circuit 70 may apply an auxiliary signal TTX1 with the same phase as that of the touch driving signal VTTX to the at least one third electrode 302 to decrease or eliminate the measurement influence due to warp or deformation of the resilient dielectric layer 200. Besides, the mutual-capacitance sensing circuit 70 may apply a DC reference voltage Vref (such as a zero volt grounded voltage) to at least part of the second electrodes 122 surrounding the selected second electrodes 122 or to all the non-selected second electrodes 122, thus reducing the influence of stray capacitance (among the second electrodes 122) to the touch sensing signal VTRX.

Figure 6A:
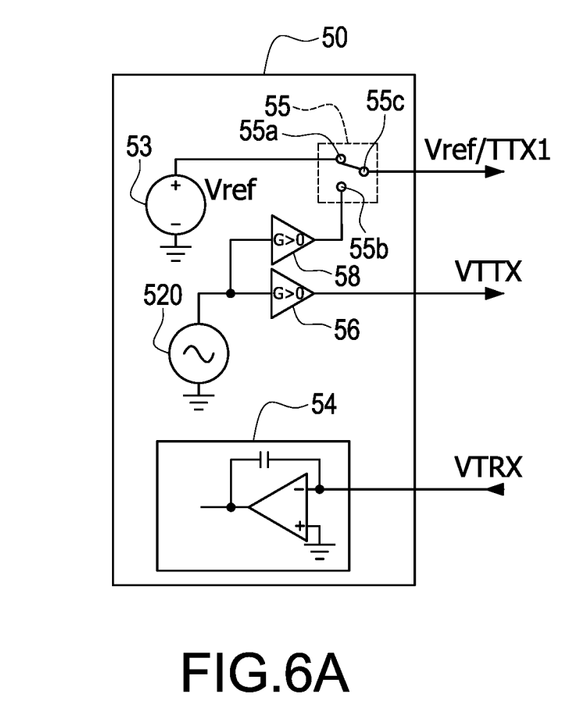
FIG. 6A shows a circuit diagram of the capacitance sensing module according to an embodiment of the present invention.

FIG. 6A shows a circuit diagram of the capacitance sensing module 50 according to an embodiment of the present invention. The capacitance sensing module 50 comprises a signal source 520, a first non-inverting amplifier 56, a second non-inverting amplifier 58, a DC reference voltage source 53, a switch 55 and a capacitance measuring circuit 54, where the switch 55 has a first end 55a, a second end 55b and a third end 55c. In touch sensing operation, the signal source 520 applies the touch driving signal VTTX, through the first non-inverting amplifier 56, to at least one second electrodes 122, where the gain of the first non-inverting amplifier 56 is preferably one. The capacitance measuring circuit 54 reads the touch sensing signal VTRX from at least one first electrode 112. When the first end 55a and the third end 55c of the switch 55 are connected, the DC reference voltage source 53 applies a DC reference voltage Vref (such as a zero volt grounded voltage) to the third electrodes 302. When the second end 55b and the third end 55c of the switch 55 are connected, the second non-inverting amplifier 58 processes the signal from the signal source 520 into the auxiliary signal TTX1 with the same phase as that of the touch driving signal VTTX. Therefore, the measurement influence due to warp or deformation of the resilient dielectric layer 200 can be reduced or eliminated. The gain of the second non-inverting amplifier 58 is preferably same as the gain of the first non-inverting amplifier 56.

Figure 5B:
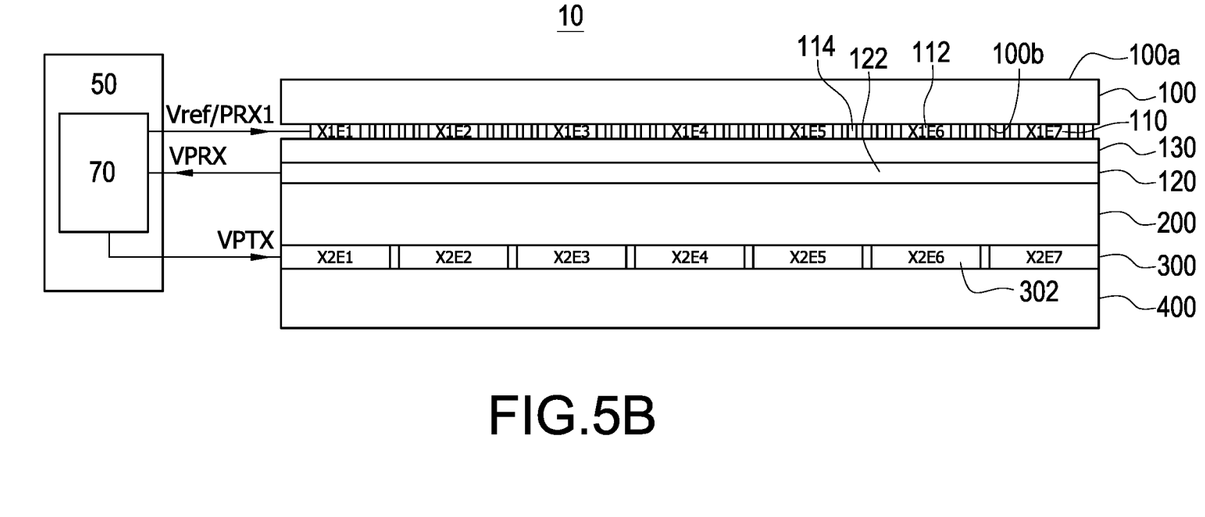
FIG. 5B shows a schematic diagram of the mutual capacitance integral sensing apparatus for touch and force sensing according to another embodiment of the present invention.

FIG. 5B shows a schematic diagram of the integral sensing apparatus 10 in force sensing operation according to an embodiment of the present invention. In force sensing operation, the mutual-capacitance sensing circuit 70 sequentially or randomly applies a force driving signal VPTX to the at least one third electrode 302, and sequentially or randomly receives a force sensing signal VPRX from at least one second electrode 122. By sensing the force sensing signal VPRX, the integral sensing apparatus 10 can identify whether a force event occurs (and corresponding exerted force) at a location corresponding to an intersection of the second electrode 122 and the third electrodes 302. With reference also to FIG. 3, by applying the force driving signal VPTX to the third electrode X2E2 and sensing the force sensing signal VPRX from the second electrode YE4, the integral sensing apparatus 10 can identify whether a force event occurs at a point corresponding to an intersection of the second electrode YE4 and the third electrode X2E2. Moreover, in force sensing operation, the mutual-capacitance sensing circuit 70 may apply a reflection signal PRX1, which has the same phase as the force sensing signal VPRX to the first electrode 112, or applies a DC reference voltage Vref (such as a zero volt grounded voltage) to the first electrode 112, thus suppressing the influence from charge of user finger.

Figure 5C:
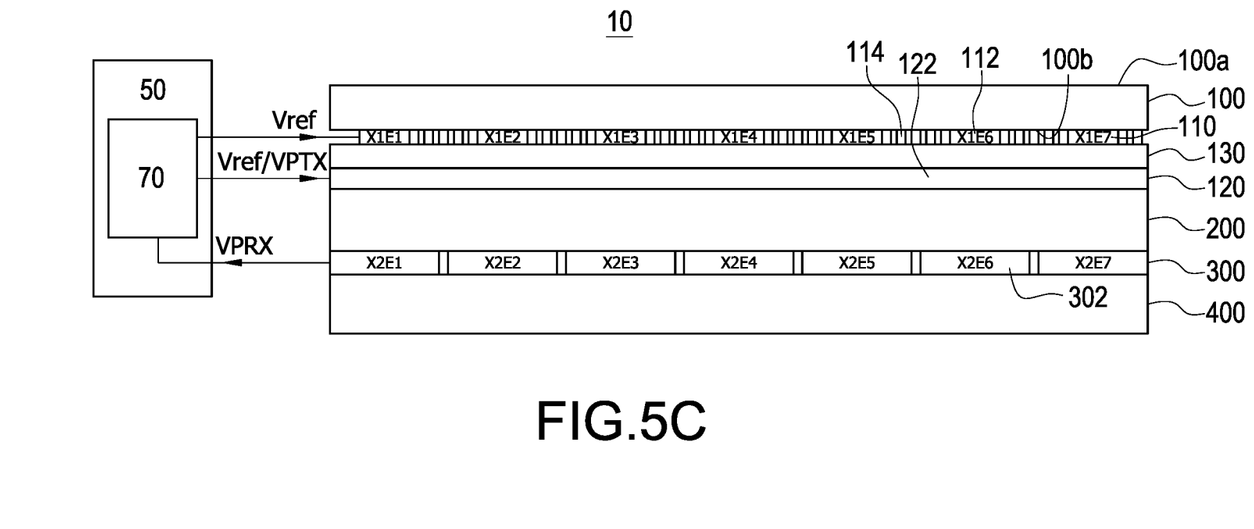
FIG. 5C shows a schematic diagram of the mutual capacitance integral sensing apparatus for touch and force sensing according to still another embodiment of the present invention.

FIG. 5C shows a schematic diagram of the integral sensing apparatus 10 in force sensing operation according to another embodiment of the present invention. The embodiment shown in FIG. 5C is similar to that shown in FIG. 5B; however, the destination for the force driving signal VPTX and the source for the force sensing signal VPRX are different. In force sensing operation for the embodiment of FIG. 5C, the mutual-capacitance sensing circuit 70 sequentially or randomly applies a force driving signal VPTX to the at least one selected second electrode 122, and sequentially or randomly receives a force sensing signal VPRX from at least one third electrode 302. By sensing the force sensing signal VPRX, the integral sensing apparatus 10 can identify whether a force event occurs at a location corresponding to an intersection of the second electrode 122 and the third electrodes 302. Moreover, in force sensing operation, the mutual-capacitance sensing circuit 70 may apply a DC reference voltage Vref (such as a zero volt grounded voltage) to the first electrodes 112 or non-selected second electrodes 122, thus suppressing the influence from charge of user finger.

Figure 6B:
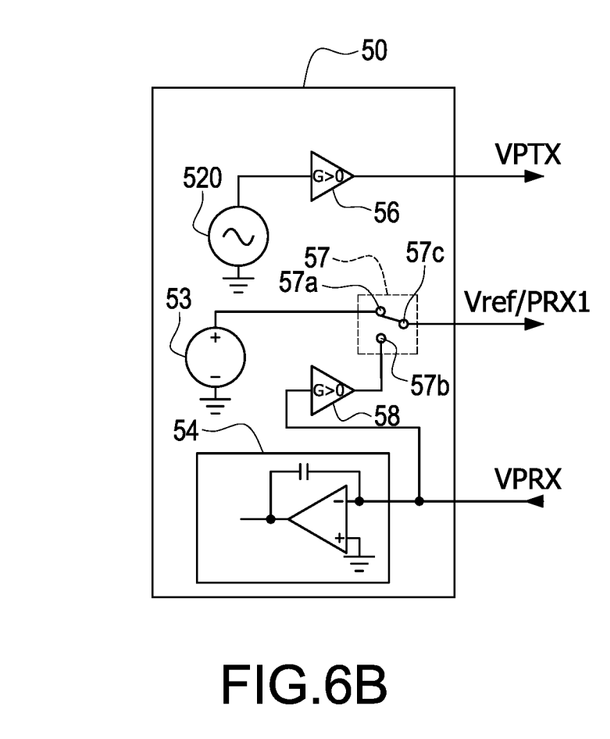
FIG. 6B shows a circuit diagram of the capacitance sensing module according to another embodiment of the present invention.

FIG. 6B shows a circuit diagram of the capacitance sensing module 50 according to an embodiment of the present invention. The capacitance sensing module 50 comprises a signal source 520, a first non-inverting amplifier 56, a second non-inverting amplifier 58, a DC reference voltage source 53, a switch 57 and a capacitance measuring circuit 54, where the switch 57 has a first end 57a, a second end 57b and a third end 57c. In force sensing operation, the signal source 520 applies the force driving signal VPTX, through the first non-inverting amplifier 56, to at least one second electrodes 122 (or at least one third electrode 302), where the gain of the first non-inverting amplifier 56 is preferably one. The capacitance measuring circuit 54 reads the force sensing signal VPRX from at least one third electrode 302 (or at least one second electrodes 122). When the first end 57a and the third end 57c of the switch 57 are connected, the DC reference voltage source 53 applies a DC reference voltage Vref (such as a zero volt grounded voltage) to the first electrodes 112. When the second end 57b and the third end 57c of the switch 57 are connected, the second non-inverting amplifier 58 processes the force sensing signal VPRX from the input of the capacitance measuring circuit 54 into the reflection signal PRX1, which has the same phase as the force sensing signal VPRX, where the gain of the second non-inverting amplifier 58 is preferably one. The reflection signal PRX1 is applied to the first electrode 112 to suppress the influence from charge of user finger.

Figure 1D:
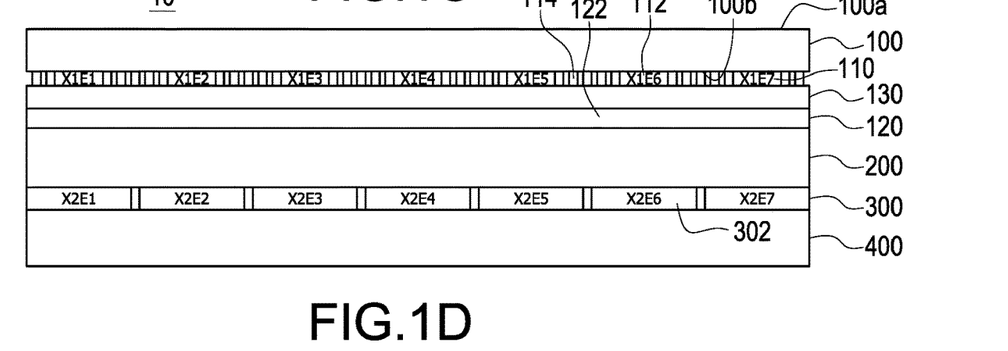
FIG. 1D shows a stack diagram of the mutual capacitance integral sensing apparatus for touch and force sensing according to still another embodiment of the present invention.
Figure 2:
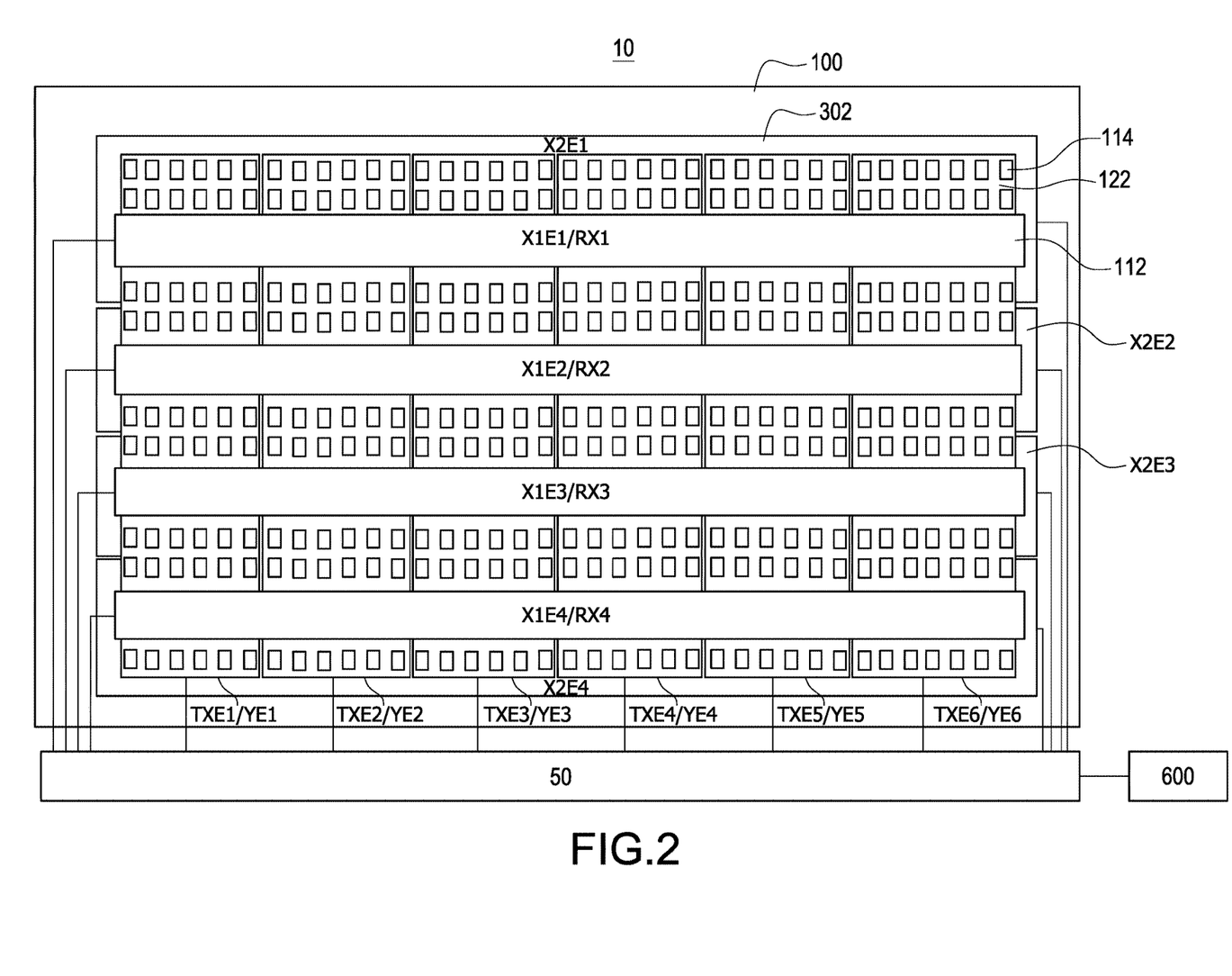
FIG. 2 shows a top view of the mutual capacitance integral sensing apparatus for touch and force sensing according to an embodiment of the present invention.

FIG. 1B shows a stack diagram of the integral sensing apparatus 10 according to another embodiment of the present invention. The embodiment shown in FIG. 1B is similar to that shown in FIG. 1A; however, the first electrode layer 110 further comprises a plurality of dummy ITO (indium tin oxide) electrodes 114 between two adjacent first electrodes 112. The dummy ITO electrodes 114 are also arranged on the second face 100b of the protection layer 100, namely, coplanar with the first electrodes 112. The dummy ITO electrodes 114 are arranged between the adjacent first electrodes 112 to prevent the drawback due to large separation between adjacent first electrodes 112. The dummy ITO electrodes 114 together with the first electrodes 112 can enhance the transparency uniformity of the first electrode layer 110; namely, enhance the transparency uniformity of the integral sensing apparatus 10. FIG. 1D shows a schematic sectional view of the integral sensing apparatus 10 according to another embodiment of the present invention. The embodiment shown in FIG. 1D is similar to that shown in FIG. 1B; however, locations of the third electrode layer 300 and the substrate 400 exchange. Namely, in the embodiment shown in FIG. 1D, the third electrode layer 300 is placed between the resilient dielectric layer 200 and the substrate 400. In the embodiment shown in FIG. 1D, the substrate 400 may be a color filter substrate for a display panel and the third electrode layer 300 is the static shielding layer of the display panel. FIG. 2 shows a top view of the integral sensing apparatus 10 according to another embodiment of the present invention, which is corresponding to the embodiments of FIGS. 1B and 1D. Similar as the embodiment shown in FIG. 3, FIG. 2 also shows the distribution of the protection layer 100, the first electrodes 112, the second electrodes 122 and the third electrodes 302 from top view. However, the integral sensing apparatus 10 shown in FIG. 2 further comprises dummy ITO electrodes 114 arranged on the second face 100b of the protection layer 100 and coplanar with the first electrodes 112.

Moreover, for the embodiments shown in FIGS. 1B, 1D and 2, the touch sensing and force sensing operation can also be conducted with approaches shown in the embodiments of FIGS. 5A-5C, 6A-6B.

Figure 7:
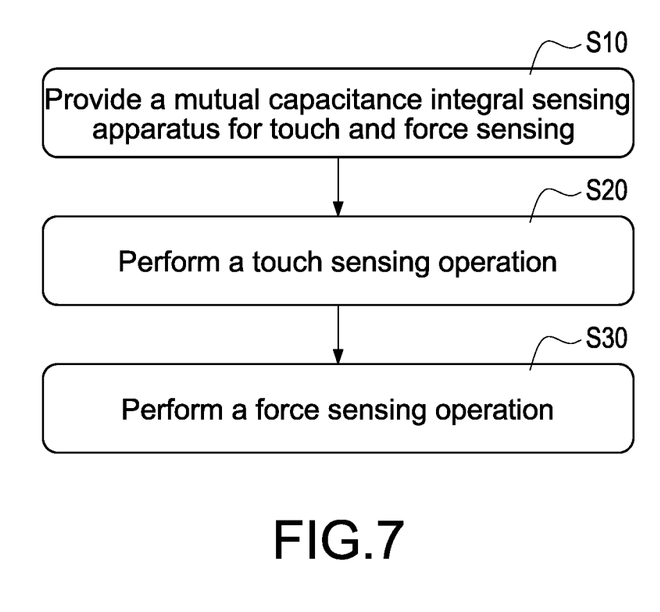
FIG. 7 shows a flowchart of a method for mutual capacitance integral touch and force sensing according to the present invention.

FIG. 7 shows a flowchart of a method for mutual capacitance integral touch and force sensing according to the present invention. The method comprises following steps. In step S10, a mutual capacitance integral sensing apparatus for touch and force sensing is provided. The integral sensing apparatus comprises a protection layer 100 having a first face 100a and a second face 100b, a first electrode layer 110 having a plurality of first electrodes 112 extended along a first direction, an insulation layer 130, a second electrode layer 120 having a plurality of second electrodes 122 extended along a second direction, a third electrode layer 300 having at least one third electrode 302, a resilient dielectric layer 200 arranged between the second electrode layer 120 and the third electrode layer 300, the resilient dielectric layer 200 being compressively deformed under pressure and restoring to original shape and volume if pressure is not present; a capacitance sensing module 50 (at least comprising the mutual-capacitance sensing circuit 70) and a processor 600. In step S20, a touch sensing operation is performed. In the touch sensing operation, the capacitance sensing module 50 applies sequentially or randomly a touch driving signal VTTX to a plurality of selected second electrodes 122 (or applies a touch driving signal VTTX to a selected second electrode 122) and receives sequentially or randomly a touch sensing signal VTRX from the selected first electrodes 112 (or receives a touch sensing signal VTRX from a selected first electrode 112), thus determining whether a touch event occurs and the corresponding touch point. In step S30, a force sensing operation is performed. In the force sensing operation, the capacitance sensing module 50 applies a force driving signal VPTX to the at least one third electrode 302 (or applies sequentially or randomly a force driving signal VPTX to multiple selected third electrodes 302), and then sequentially or randomly receives a force sensing signal VPRX from the selected second electrodes 122. Alternatively, the above-mentioned step S30 can be performed by following sub-steps: the capacitance sensing module 50 sequentially or randomly applies a force driving signal VPTX to the selected second electrodes 122 and then receives a force sensing signal VPRX from the at least one third electrode 302. After the step S20 of touch sensing operation is finished, the processor 600 may determine whether a touch event is sensed. The processor 600 sets a touch flag and records a coordinate of a touch point corresponding to the touch event if the touch event is sensed. The processor 600 clears or resets the touch flag if the touch event is not sensed. Moreover, the processor 600 may selectively decide to perform the force sensing operation or not according to the setting of touch flag or not.

In the step S20 of touch sensing operation, the capacitance sensing module 50 optionally applies a reference voltage (such as a DC reference voltage) to at least one third electrode 302 (alternatively, the capacitance sensing module 50 optionally applies an auxiliary signal TTX1 with the same phase as that of the touch driving signal VTTX to the at least one third electrode 302) to decrease or eliminate the measurement influence due to warp or deform of the resilient dielectric layer 200. In the step S30 of force sensing operation, the capacitance sensing module 50 may apply a reflection signal PRX1, which has the same phase as the force sensing signal VPRX to the first electrode 112, or apply a DC reference voltage Vref (such as a zero volt grounded voltage) to the first electrode 112, thus suppressing the influence from charge of user finger.

Moreover, in above embodiments, the protection layer is a glass substrate, a polymer thin film substrate or a cured coating layer to protect the electrodes from damage due to scratch, collision or moisture. The touch driving signal VTTX (or the force driving signal VPTX) may be an alternating signal such as sinusoid wave signal, square wave signal, triangular wave signal or trapezoid wave signal. The resilient dielectric layer comprises a resilient gelatinous material, the resilient gelatinous material is compressively deformed under pressure and restores to original shape and volume if pressure is not present. The resilient gelatinous material is, for example but not limited to, polydimethylsiloxane (PDMS), or optical clear adhesive (OCA). The substrate 400 is a glass substrate or polymer substrate. The DC reference voltage is for example a zero volt grounded voltage. The capacitance sensing module 50 comprises at least a mutual-capacitance sensing circuit 70.

Thus, particular embodiments have been described. Other embodiments are within the scope of the following claims. For example, the actions recited in the claims may be performed in a different order and still achieve desirable results.

What is claimed is:

1. A mutual capacitance integral sensing apparatus for touch and force sensing, the mutual capacitance integral sensing apparatus comprising:

a first electrode layer comprising a plurality of first electrodes extended along a first direction;

a second electrode layer comprising a plurality of second electrodes extended along a second direction substantially perpendicular to the first direction;

a third electrode layer comprising at least one third electrode extended along the first direction;

a protection layer arranged on a side of the first electrode layer;

a resilient dielectric layer arranged between the second electrode layer and the third electrode layer; and a capacitance sensing module electrically connected to the first electrode layer, the second electrode layer and the third electrode layer;

in touch sensing operation, the capacitance sensing module configured to select a plurality of second electrodes and a plurality of first electrodes, the capacitance sensing module configured to sequentially or randomly apply a touch driving signal to the selected second electrodes and sequentially or randomly receive a touch sensing signal from the selected first electrodes;

wherein the capacitance sensing module is configured to apply a reference voltage to the at least one third electrode or the capacitance sensing module is configured to apply an auxiliary signal having same phase as the touch driving signal to the at least one third electrode, the at least one third electrode is for force sensing operation:

in force sensing operation, the capacitance sensing module configured to perform force sensing by using the second electrodes and the at least one third electrode;

wherein during force sensing operation, the capacitance sensing module is configured to send a shielding signal, which generated from an amplifier by inputting a force sensing signal, to the first electrodes to shield influence from user finger or stylus;

wherein in force sensing operation, the capacitance sensing module is configured to apply a force driving signal to the at least one third electrode and sequentially or randomly receive the force sensing signal from the selected second electrodes or the capacitance sensing module is configured to sequentially or randomly apply a force driving signal to the selected second electrodes and receive the force sensing signal from the at least one third electrode;

wherein the shielding signal is a reference signal with predetermined level or the shielding signal is a reflection signal having same phase as the force sensing signal.

2. The mutual capacitance integral sensing apparatus in claim 1, wherein the touch driving signal or the force driving signal is alternating signal.

3. The mutual capacitance integral sensing apparatus in claim 1, wherein the protection layer is a glass substrate, a polymer thin film substrate or a cured coating layer.

4. The mutual capacitance integral sensing apparatus in claim 1, wherein the reference voltage is a zero volt voltage.

5. The mutual capacitance integral sensing apparatus in claim 1, wherein the resilient dielectric layer comprises a resilient gelatinous material, the resilient gelatinous material is compressively deformed under pressure and restores to original shape and volume if pressure is not present.

6. The mutual capacitance integral sensing apparatus in claim 1, wherein in touch sensing operation, the capacitance sensing module is configured to apply a reference voltage to the second electrodes surrounding the selected second electrodes.

7. The mutual capacitance integral sensing apparatus in claim 6, wherein the reference voltage is a zero volt voltage.

8. The mutual capacitance integral sensing apparatus in claim 1, further comprising a substrate arranged on a side of the resilient dielectric layer and opposite to the protection layer, the substrate is a glass substrate or polymer substrate.

9. The mutual capacitance integral sensing apparatus in claim 8, wherein the substrate is a color filter substrate for a display panel and the force electrode layer is a static shielding layer of the display panel.

10. A method for mutual capacitance integral touch and force sensing, the method comprising:

providing a mutual capacitance integral sensing apparatus, the mutual capacitance integral sensing apparatus comprising a first electrode layer comprising a plurality of first electrodes extended along a first direction, a second electrode layer comprising a plurality of second electrodes extended along a second direction substantially perpendicular to the first direction, a third electrode layer comprising at least one third electrode extended along the first direction, a protection layer arranged on a side of the first electrode layer, a resilient dielectric layer arranged between the second electrode layer and the third electrode layer; and a capacitance sensing module;

in touch sensing operation, the capacitance sensing module selecting a plurality of second electrodes and a plurality of first electrodes, the capacitance sensing module sequentially or randomly applying a touch driving signal to the selected second electrodes and sequentially or randomly receiving a touch sensing signal from the selected first electrodes, wherein the capacitance sensing module is configured to apply a reference voltage to the at least one third electrode or the capacitance sensing module is configured to apply an auxiliary signal having same phase as the touch driving signal to the at least one third electrode, the at least one third electrode is for force sensing operation; and the capacitance sensing module performing a force sensing operations;

wherein during force sensing operation, the capacitance sensing module sends a shielding signal, which generated from an amplifier by inputting a force sensing signal, to the first electrodes to shield influence from user finger or stylus; the capacitance sensing module applies a force driving signal to the at least one third electrode and sequentially or randomly receiving the force sensing signal from the selected second electrodes or the capacitance sensing module sequentially or randomly applying a force driving signal to the selected second electrodes and receiving the force sensing signal from the at least one third electrode; wherein the shielding signal is a reference signal with predetermined level or the shielding signal is a reflection signal having same phase as the force sensing signal.

11. The method in claim 10, further comprising:
determining whether a touch event is sensed after the touch sensing operation is finished; and
performing the force sensing operation if the touch event is sensed.

12. The method in claim 10, further comprising:
determining whether a touch event is sensed in the touch sensing operation; and
setting a touch flag and a recording a coordinate of a touch point corresponding to the touch event if the touch event is sensed; and
clearing or resetting the touch flag if the touch event is not sensed.

13. The method in claim 12, wherein the force sensing operation is selectively performed according to the setting of touch flag or not.

14. The method in claim 10, wherein the touch driving signal or the force driving signal is alternating signal.

* * * * *